United States Patent [19]
Stoll et al.

[11] Patent Number: 6,014,924
[45] Date of Patent: Jan. 18, 2000

[54] SLIDE DRIVE ARRANGEMENT

[75] Inventors: Kurt Stoll, Esslingen; Uwe Mödinger, Wernau; Dieter Waldmann, Ebersbach, all of Germany

[73] Assignee: Festo AG & Co., Esslingen, Germany

[21] Appl. No.: 09/040,358

[22] Filed: Mar. 17, 1998

[30] Foreign Application Priority Data

Apr. 5, 1997 [DE] Germany ................ 297 06 098 U

[51] Int. Cl.$^7$ .................................................. F01B 31/14
[52] U.S. Cl. .......................... 92/13.5; 92/13; 92/85 R; 92/85 B; 92/165 R
[58] Field of Search .................. 92/165 R, 13, 92/13.5, 13.8, 85 R, 85 B, 143

[56] References Cited

U.S. PATENT DOCUMENTS

| | | | |
|---|---|---|---|
| 5,188,018 | 2/1993 | Trenner | 92/85 B |
| 5,305,683 | 4/1994 | Gosdowski et al. | 92/165 R |
| 5,335,583 | 8/1994 | Kaneko et al. | 92/13.8 |
| 5,511,461 | 4/1996 | Miyachi et al. | 92/165 R |

FOREIGN PATENT DOCUMENTS

| | | |
|---|---|---|
| 06 83 010 A1 | 11/1995 | European Pat. Off. . |
| 333 09 33 C2 | 3/1985 | Germany . |
| 42 30 781 A1 | 3/1994 | Germany . |
| 93 20 135 U1 | 3/1994 | Germany . |
| 195 31 523 A1 | 4/1996 | Germany . |

*Primary Examiner*—Thomas E. Denion
*Attorney, Agent, or Firm*—Hoffmann & Baron, LLP

[57] ABSTRACT

A slide drive device has a principal housing, in which at least one actuating element able to be driven linearly is arranged. Externally on the principal housing there is a slide kinetically coupled with the actuating element. Two stroke limiting means render possible a variable preset of the two end positions of the slide and each comprise an adjustable arranged on the one part and a counter-abutment arranged opposite to same on the other part. The one adjustable abutment is arranged on the slide and the other adjustable abutment is located on the principal housing. Both abutments are provided in end regions facing in the same axial direction, on the slide and, respectively, on the principal housing.

14 Claims, 2 Drawing Sheets

SLIDE DRIVE ARRANGEMENT

BACKGROUND OF THE INVENTION

The invention relates to a slide drive arrangement comprising a principal housing, in which at least one actuating element able to be driven for linear motion is arranged, a slide arranged externally on the housing and kinetically coupled with the at least one actuating element, said slide being able to be guided by means of a guide means in relation to the principal housing between two end positions linearly, and two stroke limiting means acting between the principal housing and the slide for variably presetting the two end positions of the slide, such limiting means each comprising an abutment arranged on one part and able to be set in the direction of motion of the slide and a counter-abutment arranged opposite to same on the other part.

THE PRIOR ART

A slide drive arrangement of this type is for instance disclosed in the European patent publication 0 683 010 A1. Its principal housing contains one or more actuating elements in the form of pistons, which are kinetically coupled by means of a piston rod with a slide running externally on the principal housing. The slide is designed to be coupled with a component to be moved and can be driven in a reciprocating fashion linearly by causing pressure to act on the piston. To preset the two end positions of the slide two stroke limiting means are provided, which each possess an adjustable abutment, which cooperates with a fixed counter-abutment. The two adjustable abutments are arranged on mutually opposite end regions of the slide, whereas a common counter-abutment is seated between the abutments and is fixed on the principal housing.

A disadvantage of the known arrangement is to be seen in the fact that for resetting the abutment responsible for fixing the retracted end position manipulation in the path of movement of the slide drive device is required. Apart from the dangerous situation resulting from such operation, this task is also awkward to perform, since objects to be moved are as a rule secured to the top surface or end of the slide and accordingly access to the abutment may be impaired.

There is the same sort of difficulties in the case of a similar slide drive arrangement described in the European patent publication 0 603 459 A2.

SHORT SUMMARY OF THE INVENTION

One object of the invention is to provide a slide drive device of the initially described type in the case of which a less dangerous and less awkward setting of the end positions of the slide is possible.

In order to achieve these and/or other objects appearing from the present specification, claims and drawings, in the present invention there is a provision such that the one adjustable abutment is arranged on the slide and the other adjustable abutment is arranged on the principal housing, both adjustable abutments being provided on end regions, which face in the same axial direction, of the slide and, respectively, of the principal housing.

It is in this manner that a slide drive device is provided, in which both adjustable abutments are accessible from a common axial side, such axial side being as a rule the rear side of the slide drive device. Departing from the prior art the one adjustable abutment is arranged on the principal housing or body and consequently may be provided in that end region, which also has the adjustable abutment, arranged on the slide, associated with it. The adjustments for both end positions may consequently carried out extremely exactly from the same side.

Although the said European patent publication 0 603 459 has also disclosed a design, in which the adjustable abutments are arranged directly adjacent to one another, they are however still both on the moving slide and accordingly on one longitudinal side of the principal housing so that adjustments are still awkward to perform, more especially since movements of the hands necessary for adjustment still have to be performed from opposite sides on the abutments.

Further advantageous developments of the invention are defined in the claims.

It is convenient for the slide to have a recess, open toward the end, in its end region facing the adjustable abutment arranged on the principal housing, into which recess the abutment may fit, when the slide moves into the end position set thereby. The abutment may therefore be arranged within the outline of the principal housing and does not extend to the outside in an undesired fashion.

In a similar manner it is possible for the slide to have a terminal recess for the adjustable abutment arranged on it, into which recess the abutment, and more particularly the actuating region thereof to be manipulated for adjustment, may fit.

It is an advantage if the two stroke limiting means are arranged laterally on either side of the guide means extending in the longitudinal direction, it being possible for them to be provided at the two mutually opposite longitudinal sides, if there is a suitable design of the slide drive device.

The adjustable abutments may be constituted by abutment bodies, which possess an external screw thread and are received in a associated complementary screw threaded hole in a holding part provided on the slide or respectively on the principal body. By turning the abutment body it is possible for a setting movement to be produced in the direction of motion of the slide and accordingly for adjustment of the desired terminal position to be carried out. A lock nut may contribute to a reliable fixation of the terminal or end position set.

The adjustable abutments may for example be constitute by simple screws. In the case of the abutment body it may however be a question of the housing of a fluid shock absorber, which is provided in order to damp the impact of the slide on reaching the associated end position. In this case the adjustable abutment and the shock absorber associated with it may be designed in the form of a single integral unit. The latter design offers the advantage that the damping stroke remains independent of the settings of the abutment and will always be the same.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
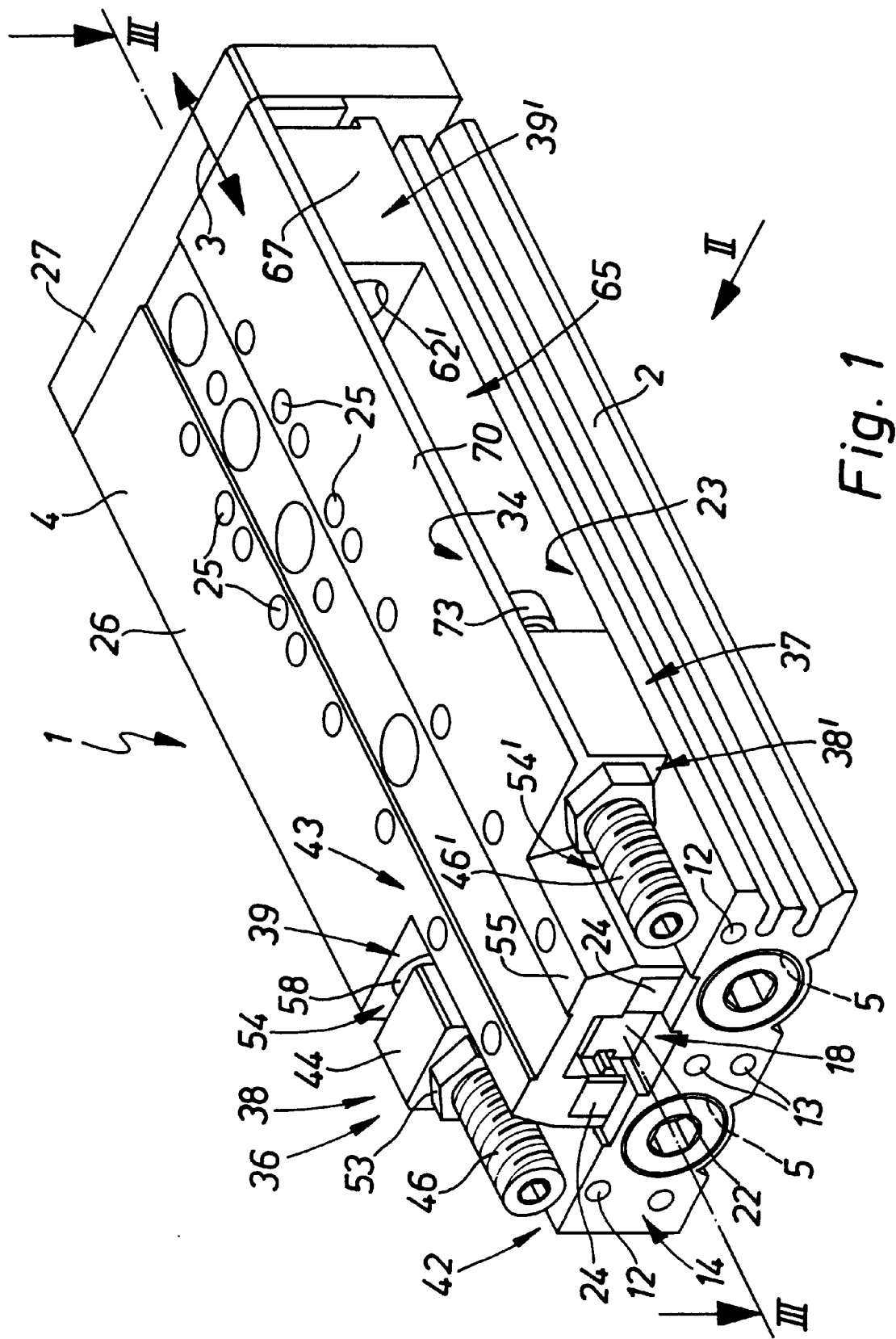
FIG. 1 shows a preferred form of embodiment of the slide drive device in a perspective representation looking toward the rear side.

The slide drive device 1 illustrated in the drawing comprises an elongated principal housing 2 and a slide 4 running thereon in the longitudinal direction as indicated by the double arrow 3 in a reciprocating manner.

In its interior the principal housing 2 possesses two housing chambers 5 arranged adjacent to each other at a distance apart and extending in the longitudinal direction 9, in which chambers a respective axially running piston 6 is provided. The piston 6 sealingly subdivides the associated housing chamber 5 into two working spaces 7 and 8 which communicate with pressure medium ducts 12 and 13 as are diagrammatically indicated in FIG. 2, such ducts opening exteriorly on the principal housing 2. It is preferred for the corresponding openings to be arranged in a common end face of the principal housing 2, for example at the rear end side 14. By way of pressure medium lines connected with the openings it is possible for a fluid pressure medium and more especially compressed air, to be supplied and let off in order to cause the piston 6 to perform a linear movement in the one or the other direction. Since all pressure medium connections are arranged jointly on the rear end side 14, the connection of the pressure medium line is extremely simple and it is possible to prevent them from colliding with the moving slide 4.

Figure 2:
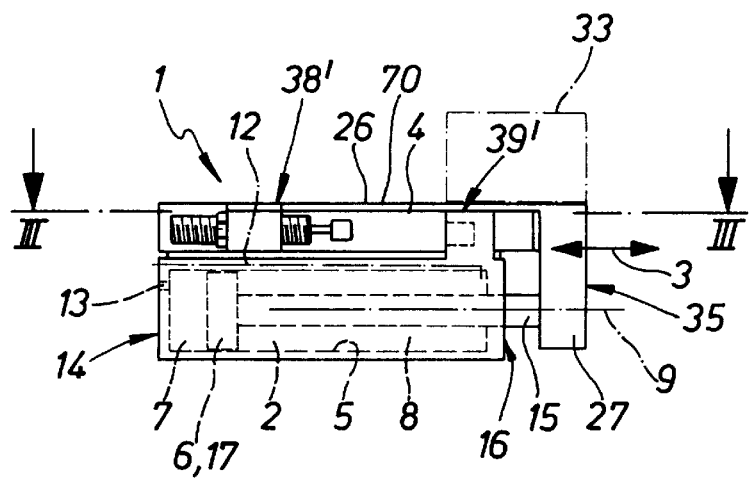
FIG. 2 is a diagrammatic side view of the slide drive device of FIG. 1 looking in the direction of the arrow II.

On each piston 6 a piston rod 15 is attached, which extends at the front end side 16 out from the principal housing 2. In FIG. 2 merely one of the piston rods 15 will be seen, the other piston rod being concealed and placed behind.

The piston rods 15 are attached to the slide 4 outside the principal housing 2. It is in this manner that the slide 4 is axially coupled kinetically, i. e. for the transmission of motion, with the pistons 6 constituting the actuating elements 17. The shifting of the position of the actuating elements 17 causes a simultaneous shift in the position of the slide 4 in the previously mentioned direction 3 of displacement.

In order to securely guide the slide 4 during its linear motion and to support it in the transverse direction a guide means 18 is placed between the slide 4 and the principal housing 2. Such guide means comprises a first guide rail 22, which is arranged on the external side of the principal housing 2 and extends in the longitudinal direction 9 thereof. The respective outlet side will in the following be termed the top side 23. The length of the first guide rail 22 is preferably substantially the same as that of the principal housing 2.

Figure 3:
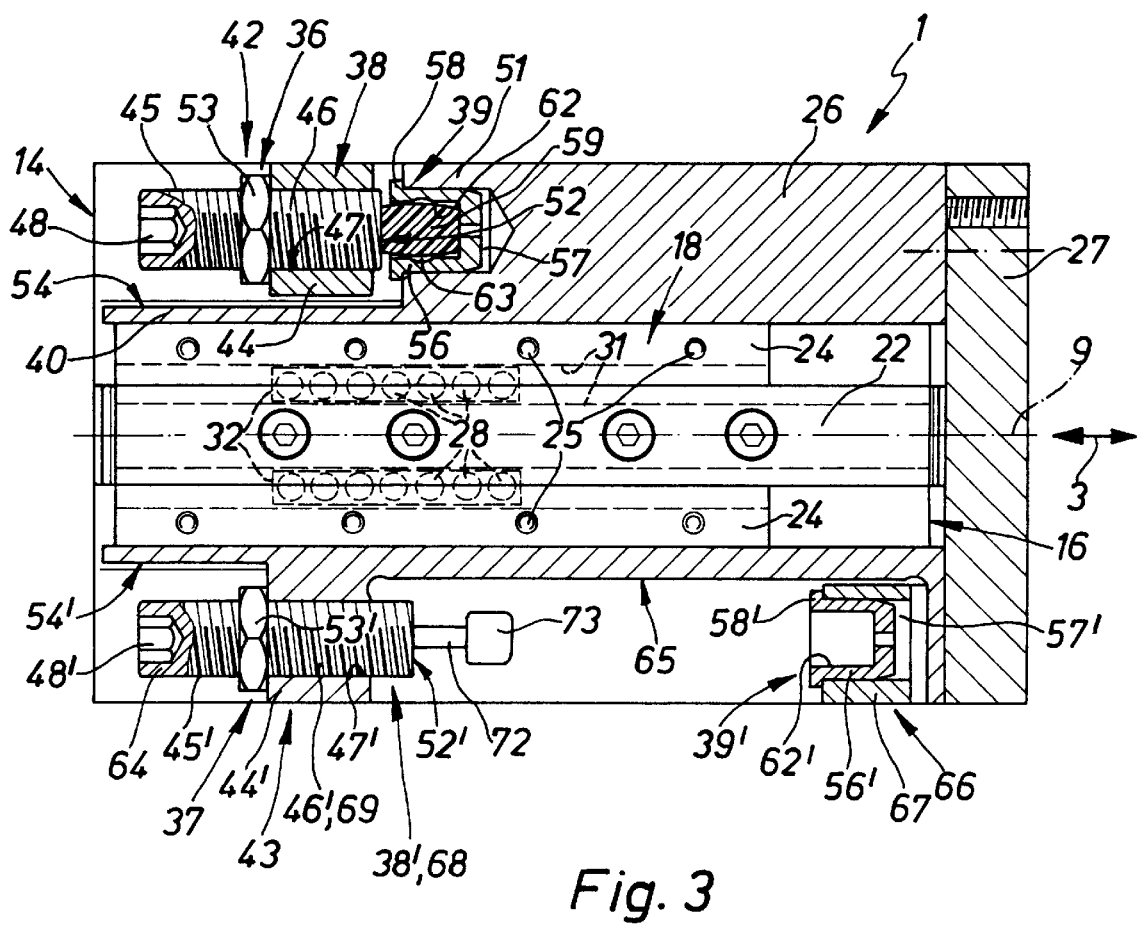
FIG. 3 is a longitudinal section taken through the slide drive device looking downward in accordance with the section line III—III of FIGS. 1 and 3.

The principal housing 2 is flattened at the top side 23. This is so because the principal housing 2, as seen in cross section, has a substantially rectangular outline. The plane, in which the two housing chambers 5 are comprised, runs in parallelism to the plane of extension of the top side 23. The first guide rail 22 is best arranged centrally in relation to the width of the top side 23, as is made clear in FIG. 3 as well.

The guide means 18 furthermore has two second guide rails 24, which are arranged on either side of the first guide rail 22 laterally adjacent to same. These second guide rails 24 are fixed by screws or other attachment means 25 to the bottom side of a plate-like first slide section 26, which extends adjacent to the top side 23 axially over the principal housing 2.

In the illustrated working embodiment the slide 4 possesses a generally L-shaped configuration, one of the L limbs being formed by the first slide section 26. This first slide section 26 extends past the front end side 16 of the principal housing 2, where there is an adjoining second slide section 27 extending downward from here in front of the said front end side 16, such section 27 constituting the other L limb. The piston rods 15 are secured to the second slide section 27.

The guide means 18 of the embodiment of the invention is designed in the form of a rolling element guide. It may as illustrated comprise two groups of a respective plurality of rolling element elements 28, for example in the form of spherical ones, which are held in a guide cage 32 and are arranged between the first guide rail 22 and the two second guide rails 24. In their two facing longitudinal sides the guide rails 22 and 24 possess longitudinal extending guide grooves 31, which complement one another in pairs to produce a guide channel, in which the rolling elements 28 are located. If the slide 4 be moved in relation to the principal housing 2, the rolling elements 32 will run in the guide grooves 32 and thus ensure low friction and an extremely precise longitudinal guiding effect.

It will be clear that instead of a rolling element guide a sliding one could be employed as well. Furthermore instead of the depicted multiple piston and piston rod arrangement of it would be possible as well to have a simple one. Furthermore the slide drive arrangement could be electrically operated, the actuating element 17 being a part provided with a screw thread running along an electric motor driven lead screw.

In operation of the slide drive device 1 a component to be moved linearly is arranged on the slide 4 as is indicated at 33 in FIG. 2 in chained lines. This component 33 naturally might be the principal housing 2 of another slide drive device 1, which is aligned at a right angle so that a multiple coordinate positioning operation may be carried out. Such an application is particularly frequent in handling. The component 33 is as a rule secured to the top side 34, facing away from the principal housing 2, of the first slide section 26 or on the front side 35, facing away from the front end side 16, of the second slide section 27.

The slide drive device 1 is furthermore provided with two stroke limiting means 36 and 37, by which the stroke, that is to say the displacement of the slide 4 in relation to the principal housing 2, may be limited by the two axial end positions of the slide 4 being preset. In this respect the one end position illustrated in FIGS. 1 and 2 is the retracted position of the slide 4, in which its first slide section 26 axially overlaps the principal housing 2 to the maximum extent and the top side 23 of the principal housing 2 in the working example is covered by it along the full length. The piston rods 15 are in this state retracted into the principal housing 2. If pressure medium is supplied, the piston rods 15 will be extended, the slide 4 being displaced forward with a reduction in the amount of overlap until it reaches the second end position, which will be termed the extended position.

Of the two stroke limiting means 36 and 37 the one (36) is provided to preset the retracted position and the other (37) is provided to preset the extended position. Both end positions are able to be set independently of one another in a variable fashion.

The first stroke limiting means 36 responsible for setting the retracted position has an abutment 38 arranged on the principal housing 2 which is axially adjustable in the direction of shift 3 of the slide 4. It will be termed the first adjustable abutment 38. In the direction 3 of displacement toward the front side a first counter-abutment 39 is opposite to the abutment 38, and such abutment 39 is fixedly provided on the slide 4.

The second stroke limiting means 37 responsible for setting the extended position has a second adjustable abutment 38' adjustably arranged on the slide 4 for movement in relation to thereto in the direction 3 of shift. In the direction of shifting a second counter-abutment 39' is arranged axially opposite to the same toward the front side, such second counter-abutment 39' being arranged on the principal housing 2.

The two adjustable abutments 38 and 38' are located in an advantageous manner on end regions 42 and 43, facing in the same axial direction, of the principal housing 2 and, respectively, of the slide 4. In the illustrated working embodiment it is in this respect a question of the rear end regions 42 and 43 of the respective parts arranged opposite to the second slide section 27. The arrangement may be such that the two adjustable abutments 38 and 38' are, when the slide 4 is in the retracted position, associated jointly with the end region 42 of the principal housing 2 and as related to the direction 3 of displacement are substantially at the same level. The arrangement ensures a simple and straightforward adjustment of the desired end setting from the rear side of the slide drive device 1 and without any interference with components 33 secured to the slide 4.

It is preferred for the two stroke limiting means 36 and 37 to be located on either side of the central guide means 18 so that mutual interference in handling and function is rendered impossible.

In what follows the two stroke limiting means 36 and 37 will be described in more detail.

The first stroke limiting means 36 for presetting the retracted position of the slide 4 comprises a holding part 44 provided on top side 23 of the rear end region 42 of the principal housing 2, such holding part 44 extending upward. This holding part 44 can be an integral part of the principal housing 2. In the embodiment of the invention it has a wedge-like form. It serves to hold the first adjustable abutment 38, which in the embodiment has an abutment body 46 provided with an external screw thread 45, such abutment body being screwed into a screw threaded hole 47 running through the holding part 44 in the longitudinal direction 9. The abutment body 46 is an elongated part and has on its rearwardly facing rear side a tool engagement part 48 for engagement by a screw driver or spanner. This engagement part is for example a recess with a set of flats although the abutment body 46 could also be a simple screw having a head.

The abutment body 46 extends through the screw threaded hole 47 and has an abutment region 52 thereof extending at the front part of the holding part 44. By turning the abutment body 46, something that results in an axial displacement, the axial position of the abutment region 52 may be set in relation to the principal housing 2. For releaseably setting the adjustment it is possible for a securing element 53 to be present, which is for instance constituted by a lock nut seated on the external screw thread 45 to clamp the holding part 44.

In its rear end region 42 on the side with the first stroke limiting means 36 the slide 4 has possesses a recess 54 which at its end is open toward the rear side. The axial length of the recess is approximately equal to the length of the distance between the front side, associated with the abutment region 52, of the holding part 44 and of the rear end side 14 of the principal housing 2. To the side the recess 54 is preferably also open so that it is only in an inward direction toward the guide means 18 that there is a remaining wall 40 of the slide 4. Should the slide 5 be in the retracted position illustrated in FIGS. 1 and 3 the first adjustable abutment 38 including the associated holding part 44 will be within and more especially entirely so, the recess 54. The arrangement offers the advantage that the central region 55, associated with the guide means 18, of the first slide section 26, which flanks the recess 54 internally, may have a length whose size is independent of the configuration of the first stroke limiting means 36 so that even when the slide 4 is retracted a considerable distance there will be a reliable long guide contact between the guide rails 22 and 24.

The counter-abutment 39 cooperating with the first adjustable abutment 38 is arranged on the adjacent end region 42 of the slide and is located on that end region 51 of the first slide section 26, which delimits the recess 54 axially toward the front side. It may be constituted directly by the slide 4 or, as in the embodiment of the invention, by a counter-abutment body 56 arranged on the slide 4. Such counter-abutment body 56 is in the form of a pot in the embodiment and is inserted in an axial recess 57 in the slide 4 and more particularly press fitted therein. A peripheral collar arranged clear of the axial recess 57 constitutes a counter-abutment region 58, which on reaching the retracted position runs onto the abutment region 52.

In order to reduce the terminal impact it is possible furthermore for a buffer element 59 to be provided, whose effect starts before reaching the associated end position. It consists for example of a material with rubber-like properties and may be so placed in the recess 62, open toward the abutment body 46, in the counter-abutment body 56 that it normally projects some distance past the counter-abutment region 58 toward the abutment region 59. It is in this manner that the buffer element 59 abuts the abutment region 52 before the counter-abutment region 58 does so and is the deformed elastically until there is contact between the counter-abutment region 58 and the abutment region 52. A widening 63 in cross section at the edge serves to permit deformation of the incompressible buffer material.

The second adjustable abutment 38' of the second stroke limiting means 37 arranged on the opposite longitudinal side and serving to preset the extended position, is, from the point of view of the type of attachment and adjustment, similar to the first adjustable abutment 38. It is arranged on a holding part 44' connected with the first slide section 26, which has an axially continuous screw threaded hole 47', through which the associated abutment body 46' is screwed. The holding part 44' is preferably an integral part of the slide 4. As seen in the retracted position of the slide 4, it is located preferably a certain distance as indicated within the rear end side 14 of the principal housing 2 and to the front delimits a recess 54' which is open toward the rear end side of the slide 4. The recess 54' serves to receive the rear end section 64 of the abutment body 46', which extends to the rear past the holding part 44'.

The rear recess 54' is also laterally open, that is to say open to the side and also open upward so that the actuating region, formed by the end section 64 and provided with the tool engagement region 48', of the abutment body and also the securing element 53 and 53' are readily accessible.

The adjustment and locking of the abutment body 46' is like that of the other abutment body 46 so that the reader may refer to the description thereof. However, in order to make distinction easier the reference numerals of the corresponding components have an extra dash.

In the region in front of the second adjustable abutment 38' of the first slide section 26 a further recess 65 is provided, in which the associated counter-abutment 39' is arranged, which is permanently connected to the principal housing 2. The counter-abutment 39' is located in the front end region 66 of the principal housing 2 in order to ensure the maximum stroke size. It comprises a holding part 67, which is more particularly made integral with the principal housing 2 and extends into the further recess 65, such holding part 67 being provided herewith an axial recess 57', which in the illustrated working embodiment extends right the way through and in which a counter-abutment 56' comparable with the above description is seated. Its counter-abutment region 58' is within the stroke of the abutment region 52' and consequently delimits the extension stroke.

The recess 65 can be covered in the fashion illustrated on the top side by a cover 70, which is best formed by a section of the slide 4. Accordingly a large unbroken attachment face is made available on the top side 34 of the first slide section 26.

The second stroke limiting means 37 is characterized furthermore by the fact that its second adjustable abutment 38' is made integrally with a shock absorber 68. For this purpose the second adjustable abutment 38' and more especially its abutment body 46' may be constituted by the cylindrical housing 69 of the shock absorber 68. It is preferably a question of a fluid shock absorber, in the case of which the damping action is based on the displacement of a hydraulic or gaseous medium. Such shock absorbers are known as such so that no detailed description of their function is required. At any rate in FIG. 3 the reader will see an impact rod 72 emerging through the front side of the housing 69 and having an impact region 73 at the free end, same accordingly projecting past the abutment region 52' toward the second counter-abutment 39'. On drawing near the extended end position the impact region 73 will be received in the bufferless recess 62' in the counter-abutment body 56' until it reaches the floor thereof so that on further movement along the stroke the impact rod 72 is received in the housing 69 and consequently causes the damping effect which effectively brakes the slide 4. The damping effect is terminated when the abutment region 52' of the housing 69 provided at the end thereof strikes against the counter-abutment region 58'

If for the purpose of changing the extended end position the second abutment body 46' is reset, this will automatically lead to a resetting of the shock absorber 68 so that the damping stroke will remain the same irrespectively of the actual set end position and separate adjustment will be unnecessary.

The arrangement could also be such that the abutment region 52' is constituted by the impact region 53 and the end position is reached when the impact rod 72 has traveled the maximum distance permitted by the shock absorber.

It remains to be mentioned that it is naturally possible for both stroke limiting means 36 and 37 to be provided, as may be desired, with or without a shock absorber 68. Refitting is possible at any time, since it is merely necessary to exchange the abutment body and the shock absorber. Furthermore the buffer element 59 is optional, it best being omitted in connection with a shock absorber 68 as illustrated and being omitted even in a shock absorber-less stroke limiting means in the case of there are only low speeds of movement along the stroke.

What is claimed is:

1. A slide drive device comprising:
    a principal housing having a front end region and a rear end region;
    at least one linearly driven actuating element provided within the housing;
    a slide arranged externally on the housing and kinetically coupled with the at least one actuating element, said slide having a front end region and a rear end region and linearly moveable between a first end position and a second end position;
    a guide means positioned between the housing and the slide, said guide means guiding the slide between the first end position and the second end position; and
    a stroke limiting means acting between the principal housing and the slide for variably presetting the first end position and the second end position of the slide, said limiting means including;
        a first adjustable abutment arranged on one of the front end region and rear end region of the slide and set in the direction of motion of the slide;
        a first counter-abutment arranged on the housing and opposing the first adjustable abutment;
        a second adjustable abutment arranged on one of the front end region and rear end region of the housing and set in the direction of motion of the slide;
        a second counter-abutment arranged on the slide and opposing the second adjustable abutment; said first adjustable abutment and second adjustable abutment facing in the same axial direction.

2. The slide drive device of claim 1, wherein the at least one actuating element includes a fluid actuated piston having a piston rod extending from the front end region of the principal housing and secured to the front end region of the slide, said first adjustable abutment being arranged on the rear end region of the slide, and said second adjustable abutment being arranged on the rear end region of the housing.

3. The slide drive device of claim 2 including two actuating elements, each actuating element being a fluid actuated piston having a piston rod extending from the front end region of the principal housing and secured to the front end region of the slide.

4. The slide drive device of claim 1, wherein the slide has a first section and a second section which meet to form an L-like configuration, said first section being axially aligned with the principal housing and guided thereon, said second section extending past the first end region or the second end region of the principal housing and coupled with the actuating element.

5. The slide drive device of claim 1, wherein the first counter-abutment is arranged on the end region of the principal housing which is axially opposite to the first adjustable abutment, and the second counter-abutment is arranged on the end region of the slide which is axially opposite to the second adjustable abutment.

6. The slide drive device of claim 1, wherein the slide has an open ended recess on the end region which faces the second adjustable abutment, said recess receiving the second adjustable abutment as the slide moves linearly between the first end position and the second end position.

7. The slide drive device of claim 1, wherein the slide has an open ended recess on the end region having the first adjustable abutment arranged thereon, a holding part axially internally delimiting the recess and bearing the first adjustable abutment, said abutment being received in the recess.

8. The slide drive device of claim 1, wherein the first adjustable abutment and the second adjustable abutment are substantially at the same level in relation to the direction of movement of the slide.

9. The slide drive device of claim 1, wherein the first adjustable abutment and the second adjustable abutment are arranged on either side of the guide means.

10. The slide drive device of claim 1, wherein the slide extends axially over the principal housing, and the guide means extends centrally along the slide and the principal housing.

11. The slide drive device of claim 1, wherein the first adjustable abutment and the second adjustable abutment each include;
   a holding part having a screw threaded hole; and
   an abutment body having an external screw thread, said external screw thread cooperating with the screw threaded hole to adjustably hold the abutment body.

12. The slide drive device of claim 1, wherein at least one of the first adjustable abutment and the second adjustable abutment includes a fluid shock absorber.

13. The slide drive device of claim 12, wherein the at least one of the first adjustable abutment and the second adjustable abutment includes an integral adjustable abutment and fluid shock absorber.

14. The slide drive device of claim 13, wherein the fluid shock absorber has a housing which constitutes at least a portion of the adjustable abutment.

* * * * *